(12) United States Patent
Jalan

(10) Patent No.: US 10,790,548 B1
(45) Date of Patent: Sep. 29, 2020

(54) METHOD AND SYSTEM FOR MANAGING THE USAGE OF A PLURALITY OF BATTERY UNITS TO POWER AN ELECTRIC VEHICLE

(71) Applicant: Devansh M Jalan, Mumbai (IN)

(72) Inventor: Devansh M Jalan, Mumbai (IN)

(*) Notice: Subject to any disclaimer, the term of this patent is extended or adjusted under 35 U.S.C. 154(b) by 0 days.

(21) Appl. No.: 16/747,968

(22) Filed: Jan. 21, 2020

(51) Int. Cl.
   *H01M 2/40* (2006.01)
   *H01M 10/42* (2006.01)
   *H01M 2/10* (2006.01)
   *H01M 10/44* (2006.01)

(52) U.S. Cl.
   CPC ....... *H01M 10/425* (2013.01); *H01M 2/1077* (2013.01); *H01M 2/1083* (2013.01); *H01M 10/441* (2013.01); *H01M 2010/4271* (2013.01); *H01M 2220/20* (2013.01)

(58) Field of Classification Search
   CPC ............. H01M 10/425; H01M 10/441; H01M 2/1077; H01M 2010/4271; H01M 2220/20
   See application file for complete search history.

(56) References Cited

U.S. PATENT DOCUMENTS

| 2014/0250909 A1* | 9/2014 | Sowden | ............... H02P 9/08 60/778 |
| 2016/0178684 A1* | 6/2016 | Kato | ............... G01R 31/50 324/437 |
| 2017/0268474 A1* | 9/2017 | Kirk | ............... F02N 11/0851 |

* cited by examiner

*Primary Examiner* — Raymond Alejandro
(74) *Attorney, Agent, or Firm* — Kunzler Bean & Adamson

(57) ABSTRACT

The invention provides a method and system for managing the usage of a plurality of battery units (102a-102n) to power an electric vehicle using a computer-controlled electric circuit (110). To start with, a computer (104) selects two or more battery units from a plurality of battery units to form a series connection as the initial set of battery units to power the electric vehicle. The computer (104) then identifies one or more battery units from the initial set of battery units to be replaced based on a pre-determined discharge level, a malfunction or a disconnection of the one or more battery units. The computer (104) then identifies one or more replacement battery units and hands over energy flow from the one or more battery units to be replaced to the one or more replacement battery units by controlling a plurality of relay switches (112a-112n) in an iterative/recursive manner.

12 Claims, 3 Drawing Sheets

METHOD AND SYSTEM FOR MANAGING THE USAGE OF A PLURALITY OF BATTERY UNITS TO POWER AN ELECTRIC VEHICLE

FIELD OF THE INVENTION

The invention generally relates to a method and system for managing the usage of multiple battery units for powering electric vehicles. More specifically, the invention relates to a method and system for segregating and prioritizing the usage of multiple battery units to power an electric vehicle by means of a computer-controlled electric circuit.

BACKGROUND OF THE INVENTION

Battery units are a primary source of power for electric vehicles. Electric vehicles, when compared to vehicles with internal combustion engines, are substantially more expensive and require longer time periods for charging. There are several issues relating to the charging infrastructure for electric vehicles, which are rare to be found right now and will take a long time to develop at the current pace.

Hitherto known charging techniques in vehicles, utilize battery swapping and plug-in charging methods to overcome issues involved with depletion in charge levels of a single battery source for power. However, these techniques have not been efficiently exploited for use in electric vehicles, owing to the size and charge capacity of battery units required by the electric vehicles for a reasonable driving range or mileage, along with several other charging related issues including long charging time needed presently for plug-in charging methods.

In a scenario where the battery swapping method is used in electric vehicles, there will be too many battery units in the vehicle, all of which will have to either form a parallel or series circuit. If the circuit is parallel in nature, all the battery units will have to be at the same charge level to prevent some batteries from charging others rather than powering the load. On the other hand, if all the battery units form a series circuit, they will drain together. The problem with all batteries draining together is that in case of swapping, there are wasted charge losses for the consumer. There will also be a loss of potential range of the vehicle after the battery has been swapped, not to mention the fact that all battery units will need to be charged at the same time, causing great inconvenience to the consumer.

Therefore, in light of the above, there exists a need for a method and system for managing, optimizing, and charging battery units in electric vehicles in an efficient, convenient and economical manner, so that the electric vehicles are powered for long distances without experiencing a total power drain, and for efficiently charging the batteries, thus reducing the cost losses incurred.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the invention.

Figure 1:
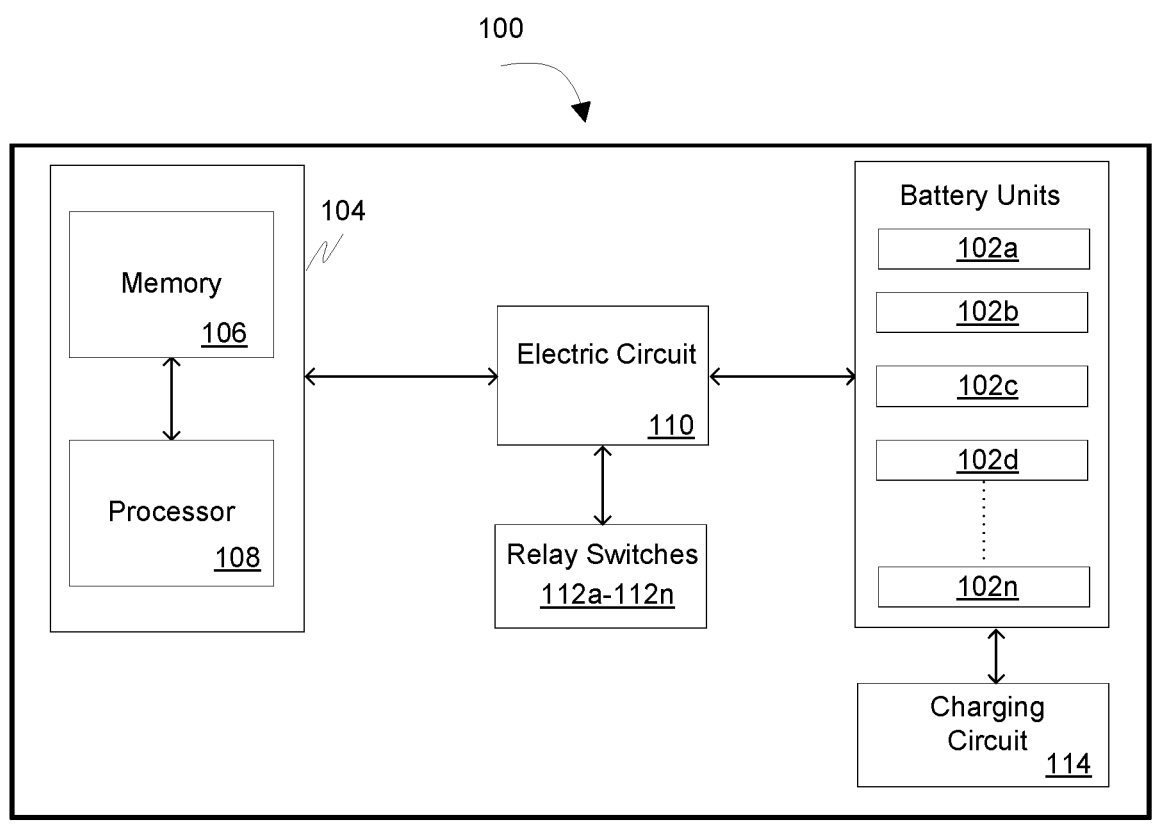
FIG. 1 illustrates a system for managing the usage and charging of a plurality of battery units to power an electric vehicle in accordance with an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION OF THE INVENTION

Before describing in detail embodiments that are in accordance with the invention, it should be observed that the embodiments reside primarily in combinations of method steps and system components related to segregating and prioritizing the usage of battery units from a plurality of battery units to power an electric vehicle by means of a computer-controlled electric circuit.

Accordingly, the system components and method steps have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article or composition that comprises a list of elements does not include only those elements but may include other elements not expressly listed or inherent to such process, method, article or composition. An element proceeded by "comprises . . . a" does not, without more constraints, preclude the existence of additional identical elements in the process, method, article or composition that comprises the element.

Various embodiments of the invention provide a method and system for managing the usage of a plurality of battery units to power an electric vehicle using a computer-controlled electric circuit. The electric circuit controlled by the computer includes a plurality of relay switches for engaging/connecting and disengaging/disconnecting one or more battery units to supply power to the electric vehicle. To start with, the computer selects two or more battery units from a plurality of battery units to form a series connection and are referred to as the initial set of battery units to power the electric vehicle. In an embodiment, two or more battery units of the plurality of battery units having the highest charge level and the lowest serial number are selected by the computer to form the initial set of battery units. The computer then identifies one or more battery units to be replaced from the initial set of battery units based on a status associated with the one or more battery units. The status can be, but need not be limited to, the one or more battery units reaching a pre-determined discharge level, a malfunction of the one or more battery units, and a disconnection of the one or more battery units. In response to determining that the one or more battery units are to be replaced, the computer identifies one or more replacement battery units from the remaining battery units of the plurality of battery units, for handing over energy flow from the one or more battery units to be replaced to the one or more replacement battery units. For achieving the hand over, the computer controls one or more relay switches of the electric circuit in an iterative/recursive manner, to engage/connect the one or more replacement battery units in series with the initial set of battery units and to then disengage/disconnect the one or more battery units to be replaced from the initial set of battery units.

FIG. 1 illustrates a system 100 for managing the usage and charging of a plurality of battery units 102a-102n to power an electric vehicle in accordance with an embodiment of the invention.

As illustrated in FIG. 1, system 100 includes a computer 104 having a memory 106 and a processor 108 communicatively coupled to memory 106. Processor 108 controls an electric circuit 110 which includes a plurality of relay switches 112a-112n. Plurality of relay switches 112a-112n are used in engaging/connecting and disengaging/disconnecting plurality of battery units 102a-102n for powering the electric vehicle.

For use in the electric vehicle, each of the battery units, ideally of 48 volts and 20 ampere hours, fit inside individual ports which connect them to electric circuit 110. These battery units are removable and portable in nature.

Each battery unit port has a pin connecting the battery unit to computer 104. The battery units convey their individual energy levels to computer 104 through the connecting pins in their ports. Further, voltmeters may be used to convey the output to computer 104. Computer 104 is programmed to take digital inputs from the battery units or through voltmeters, and determine which battery units will power the loads. These battery units are connected to each other and regulated by plurality of relay switches 112a-112n. Each relay switch of plurality of relay switches 112a-112n has a terminal which receives inputs from computer 104 through the bus (connected to computer 104) for the individual relay switches to go on or off. Thus, only two/three individual battery units are drained as the initial set of battery units at any given point in time.

To begin with, the electric vehicle is powered by an initial set of battery units considered as a primary energy source. Processor 108 selects two or more battery units from plurality of battery units 102a-102n to form a series connection as the initial set of battery units to power the electric vehicle. In an embodiment, two or more battery units of plurality of battery units 102a-102n having the highest charge level and the lowest serial number are selected by processor 108 to form the initial set of battery units.

Processor 108 is configured to determine when one or more battery units from the initial set must be replaced based on a status of the one or more battery units. In an embodiment, processor 108 determines that a battery unit from the initial set must be replaced when the battery unit has reached a predetermined discharge level. All battery units of the initial set may not necessarily reach the predetermined discharge level at the same point in time and may be at disparate charge levels. In another embodiment, processor 108 determines that a battery unit from the initial set must be replaced due to a malfunction of the battery unit. In yet another embodiment, processor 108 determines that a battery unit from the initial set must be replaced if the battery unit is disconnected from the initial set.

In response to determining that one or more battery units are to be replaced, processor 108 identifies one or more replacement battery units from the remaining battery units of plurality of battery units 102a-102n for handing over energy flow from the one or more battery units to be replaced to the one or more replacement battery units.

In an embodiment, processor 108 sorts plurality of battery units 102a-102n based on their charge levels and serial numbers. Processor 108 then selects one or more battery units having the highest charge level and the lowest serial number from plurality of battery units 102a-102n as the one or more replacement battery units. In an instance, if two or more battery units have the same highest charge levels and a single battery unit is to be selected for replacement, processor 108 selects the battery unit having the lowest serial number of the two or more battery units.

For achieving the hand over, processor 108 controls one or more relay switches of plurality of relay switches 112a-112n of electric circuit 110 in an iterative/recursive manner, to engage/connect the one or more replacement battery units in series with the initial set of battery units and to then disengage/disconnect the one or more battery units to be replaced from the initial set of battery units.

In an embodiment, a stabilizer may be used to manage the voltage surge when a replacement battery unit is first added to the initial set of battery units. Further, system 100 includes one or more secondary battery units that are continuously charged by the initial set of battery units or the primary energy source while powering appliances of the electric vehicle. When the handover takes place, the one or more secondary battery units may not receive power from the initial set, but continue to power the appliances undisturbed with the power they have stored.

For instance, consider battery unit 102a and battery unit 102b are connected in series and form the initial set. To minimize loss of current to the loads during handover, when battery unit 102a and battery unit 102b have reached a pre-determined discharge level, processor 108 determines that battery unit 102c and battery unit 102d must form the series, using the stepwise process. A first step includes addition of battery unit 102c to the series formation of battery units 102a and 102b. A second step includes removing battery unit 102a, and as a result battery unit 102b and battery unit 102c form the series. An ensuing step includes addition of battery unit 102d to the series formation of battery units 102b and 102c and a final step includes removing battery unit 102b, thereby leaving battery unit 102c and battery unit 102d to form the series.

In accordance with an exemplary embodiment, if three or more battery units are at the same charge level or at 100% charge, processor 108 turns certain relay switches on or off to put the first two battery units (by serial number) in a series formation to power the loads. If all batteries are at disparate charge levels, the two battery units with the highest charge levels are used to power the loads.

For instance, when a primary energy source, consisting of two battery units at a time, shifts to another set of two battery units, the handover is performed to prioritize utilization of the battery units, wherein individual battery units of the highest charge level, and also the lowest serial number are selected for utilization in case the battery units have the same charge level. The threshold for changing the battery unit being used can be, but need not be limited to, 10% of the total capacity of that battery unit.

When all the battery units have reached charge levels of 10% or below, the above process is repeated until each battery unit has reached 2% of their individual charge capacities. Processor 108 then opens certain relay switches to prevent the flow of current from the primary energy source to the loads.

Further, system 100 includes a charging circuit 114 for charging one or more battery units of plurality of battery units 102a-102n. Charging circuit 114 is connected to an external power source, and a regenerative braking system. The one or more battery units are charged using current from either the external power source via charging circuit 114 when the electric vehicle is stationary, or the regenerative braking system via charging circuit 114 when the electric vehicle is in motion.

In an embodiment, processor 108 selects the one or more battery units having the lowest charge level and the highest serial number from plurality of battery units 102a-102n for charging. In an instance, if two or more battery units are at the same lowest charge level and one battery unit is to be selected for charging, processor 108 selects the battery unit having the highest serial number of the two battery units.

In another embodiment, each battery unit can be charged by either an external charger after removal from the port or through an internal charging process of charging circuit 114 while fitted in the port.

Figure 2:
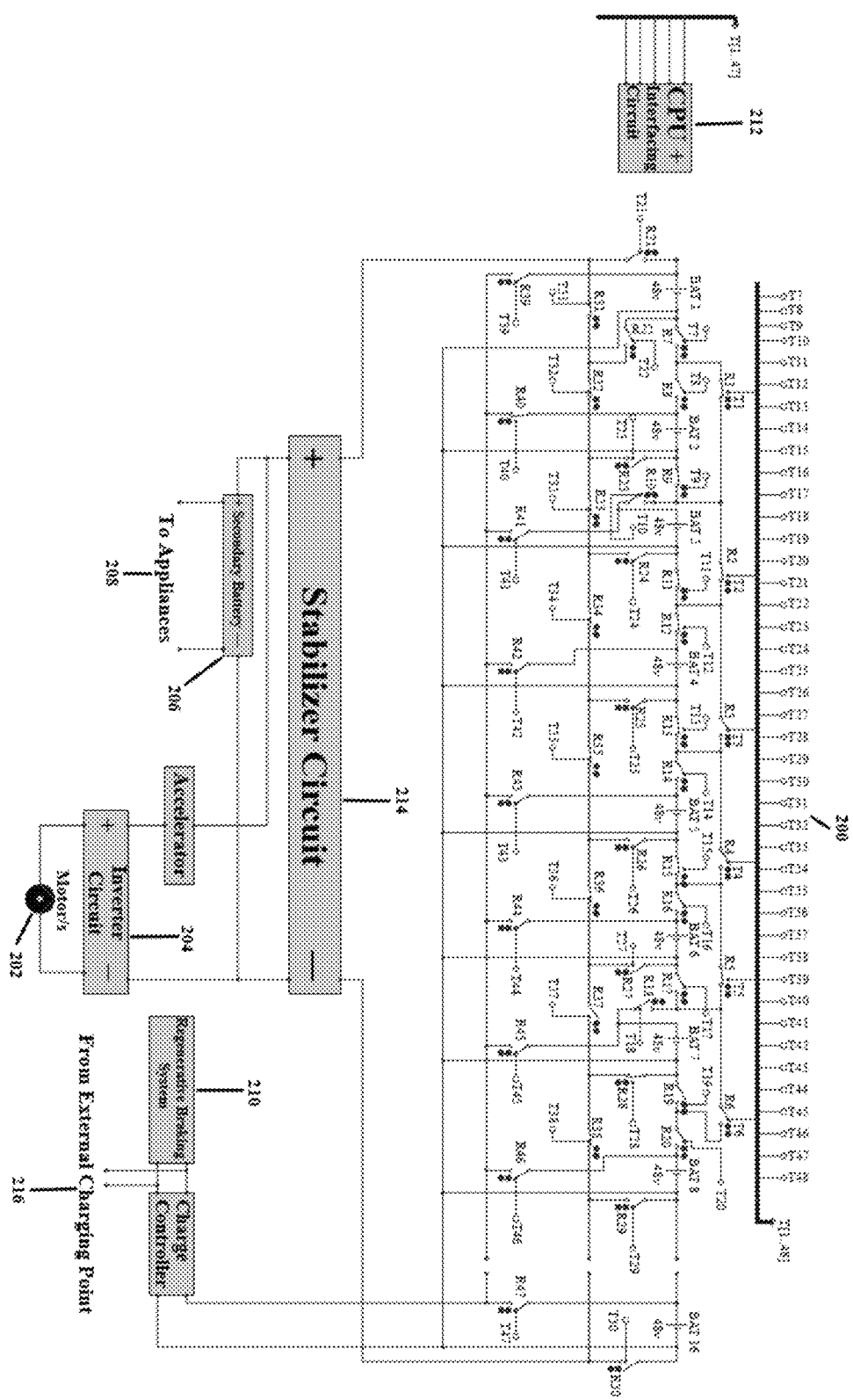
FIG. 2 illustrates a schematic representation of a system for managing the usage and charging of a plurality of battery units separately in sets of pre-defined numbers based on certain parameters to power an electric vehicle and for charging the plurality of battery units in accordance with an exemplary embodiment of the invention.

FIG. 2 illustrates a schematic representation 200 of system 100 for managing the usage and charging of plurality of battery units 102a-102n separately in sets of pre-defined numbers based on certain parameters to power an electric vehicle and for charging plurality of battery units 102a-102n in accordance with an exemplary embodiment of the invention.

Following are the notations in FIG. 2: T—Terminal, R—Relay Switch, v—Volts, and BAT—Battery unit in plurality of battery units 102a-102n.

At any given time (if there is available charge in the battery units), two/three individual battery units (as determined by processor 108) form a series circuit (when processor 108 turns certain relay switches on or off) as the primary energy source to power the loads. This primary energy source charges secondary battery units while simultaneously powering motor(s) 202 through an inverter 204 (if necessary).

A secondary battery unit 206 powers electrical appliances/electronics 208 of the electric vehicle so that the momentary loss of power during the handover between battery units forming the primary energy source has no effect on functions of electrical appliances/electronics 208. While secondary battery unit 206 is drawing energy from the primary energy source, the rate of inflow from the primary energy source into secondary battery unit 206 must always be equal to or greater than the rate of outflow from secondary battery unit 206 to electrical appliances/electronics 208 so that secondary battery unit 206 maintains a state of full or almost full charge. A regenerative braking system 210 is further used in the electric vehicle to harness wasted energy.

The internal processes of system 100 is further described in detail in conjunction with FIG. 2.

For this illustration, only battery numbers BAT1-BAT6 are considered referring to FIG. 2. The initial charge levels of the batteries are provided in Table 1.

TABLE 1

| Battery Number | Charge % |
|---|---|
| BAT1 | 100% |
| BAT2 | 0% |
| BAT3 | 90% |
| BAT4 | 80% |
| BAT5 | 6% |
| BAT6 | 70% |

Referring to FIG. 2, to start with, all the relay switches are open (switched off). A computer 212 determines that battery numbers BAT1 and BAT3 will form the series. To connect BAT1 and BAT3 in series, relay numbers R34-R38, R24, R10, R1, R7 and R21 are closed (switched on) by computer 212.

When the electric vehicle is in motion, regenerative braking system 210 is harnessing current as per its known application. Computer 212 then determines that battery number BAT2 shall be powered by this current. To enable this, computer 212 closes relay switch number R40.

After the vehicle has covered an approximate distance, the charge levels of the given battery units are as shown in Table 2.

TABLE 2

| Battery Number | Charge % |
|---|---|
| BAT1 | 20% |
| BAT2 | 20% |
| BAT3 | 10% |
| BAT4 | 80% |
| BAT5 | 6% |
| BAT6 | 70% |

Since battery number BAT3 has reached the predetermined discharge level, computer 212 determines that BAT3 must be removed from the series and battery number BAT4 must be included. Computer 212 determines BAT4 must be included in the series since it has the highest charge level and the lowest serial number of all the batteries.

Computer 212 then adds BAT4 to the series formation. To initiate this process, computer 212 first opens R40 to disconnect regenerative braking system 210 from the circuit. Computer 212 then opens relay switch numbers R34 and R24. In an ensuing step, computer 212 closes relay switch numbers R11, R12 and R25. A stabilizer circuit 214 prevents the voltage fluctuations from reaching secondary battery unit 206 or motor(s) 202. Now, battery numbers BAT1, BAT3 and BAT4 form the series.

Computer 212 then removes battery number BAT3 from the circuit. Relay switch numbers R10 and R11 are opened, while relay switch number R2 is closed by computer 212. With this action, battery numbers BAT1 and BAT4 form the series.

While the electric vehicle continues to be in motion, computer 212 determines which battery must be charged using regenerative braking system 210. Based on the condition of the lowest charge level and the highest serial number, computer 212 determines that battery number BAT5 must be charged by regenerative braking system 210. Computer 212 then closes relay number R43.

The electric vehicle continues to be in motion, and after a while battery number BAT1 reaches the predetermined discharge level. The charge levels of the batteries are as shown below in Table 3.

TABLE 3

| Battery Number | Charge % |
|---|---|
| BAT1 | 10% |
| BAT2 | 20% |
| BAT3 | 10% |
| BAT4 | 70% |
| BAT5 | 8% |
| BAT6 | 70% |

Computer 212 determines that battery number BAT6 is to be engaged in series with battery numbers BAT1 and BAT4 and battery number BAT1 is to be disengaged. In response to the determination, computer 212 opens switch number R43 to disconnect regenerative braking system 210 from the circuit. Computer 212 then opens R35, R36 and R25, and closes R27, R16, R4 and R13. Now, battery numbers BAT1, BAT4 and BAT6 are in series. To remove battery number BAT1 from this series formation, computer 212 first opens R21, R1, R7 and R2, after which switches R11, R24, R33, R32 and R31 are closed by computer 212. With these actions, battery numbers BAT4 and BAT6 form the series.

Computer 212 then determines that battery number BAT5 must be charged by regenerative braking system 210 and therefore closes switch number R43.

If the consumer decides to charge the battery units via an external charging point 216 in the electric vehicle, the current will only flow towards plurality of battery units 102a-102n. Computer 212 identifies switches to be opened or closed based on which battery unit is to be charged, by choosing one or more battery units with the lowest charge level and highest serial number (if battery units are at the same charge level) for charging via external charging point 216.

Figure 3:
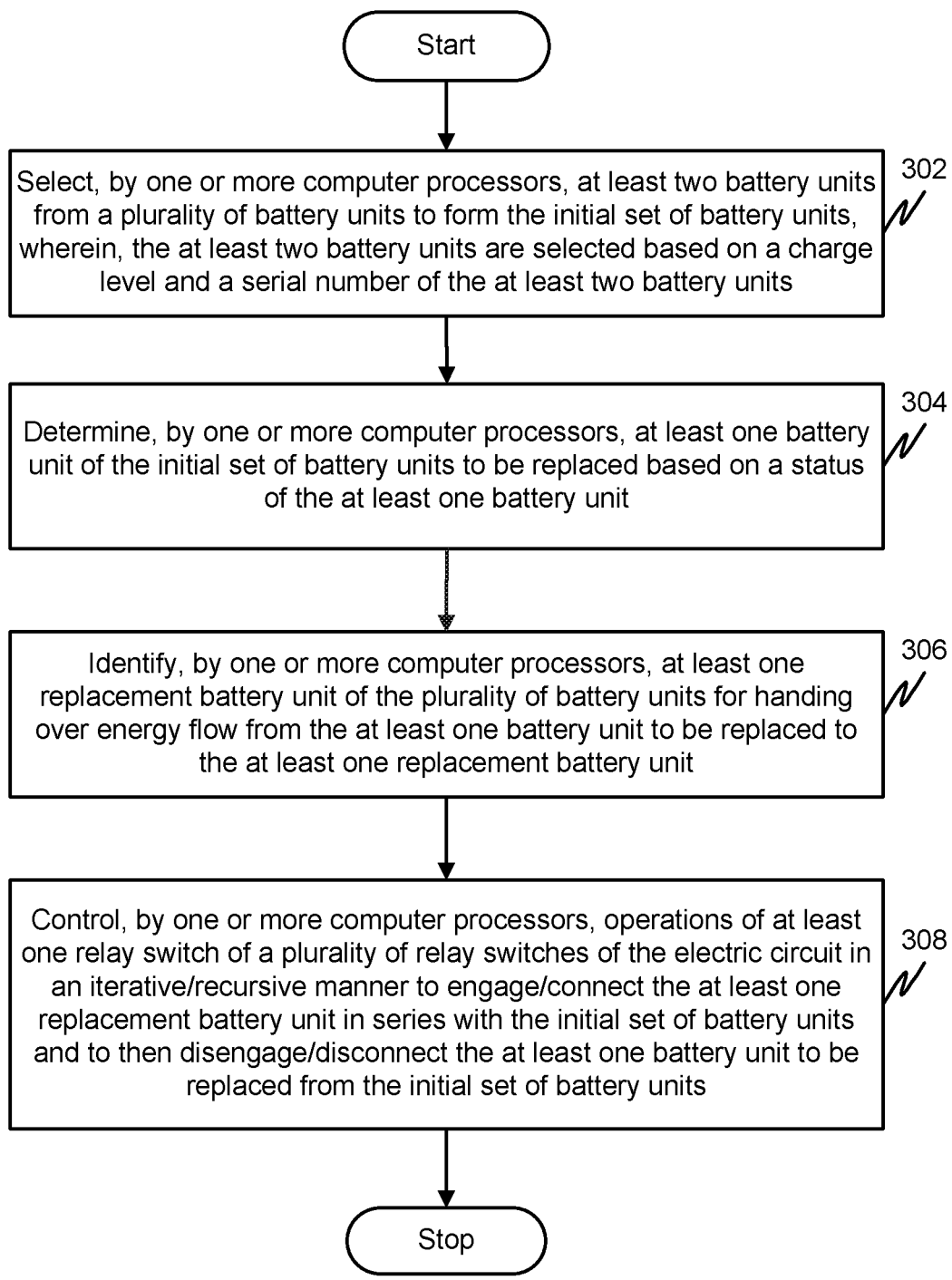
FIG. 3 illustrates a flowchart of a method for managing the usage of a plurality of battery units to power an electric vehicle in accordance with an embodiment of the invention.

FIG. 3 illustrates a flowchart of a method for managing the usage of plurality of battery units 102a-102n to power an electric vehicle in accordance with an embodiment of the invention.

As illustrated in FIG. 3, to start with, at step 302, processor 108 selects two or more battery units from plurality of battery units 102a-102n to form a series connection as the initial set of battery units to power the electric vehicle. In an embodiment, two or more battery units of plurality of battery units 102a-102n having the highest charge level and the lowest serial number are selected by processor 108 to form the initial set of battery units. A requisite number of battery units are enough to form the initial set to power the electric vehicle, and remaining slots need not be necessarily used.

At step 304, processor 108 then determines whether one or more battery units from the initial set of battery units are to be replaced based on a status of the one or more battery units. The status can be, but need not be limited to, the one or more battery units reaching a pre-determined discharge level, a malfunction of the one or more battery units, and a disconnection of the one or more battery units. In an embodiment, processor 108 determines that a battery unit from the initial set must be replaced when the battery unit has reached a predetermined discharge level. In another embodiment, processor 108 determines that a battery unit from the initial set must be replaced due to a malfunction of the battery unit. In yet another embodiment, processor 108 determines that a battery unit from the initial set must be replaced if the battery unit is disconnected from the initial set.

In response to the determination, at step 306, processor 108 identifies one or more replacement battery units from the remaining battery units of plurality of battery units 102a-102n, if any, for handing over energy flow from the one or more battery units to be replaced to the one or more replacement battery units.

In an embodiment, processor 108 selects one or more battery units from plurality of battery units 102a-102n having the highest charge level and the lowest serial number as the one or more replacement battery units for replacing the one or more battery units from the initial set of battery units.

For achieving the hand over, at step 308, processor 108 controls operations of one or more relay switches of plurality of relay switches 112a-112n of electric circuit 110 in an iterative/recursive manner, to engage/connect the one or more replacement battery units in series with the initial set of battery units and to then disengage/disconnect the one or more battery units to be replaced from the initial set of battery units.

A process flow of the method and system is further described in detail in conjunction with an exemplary illustration.

The illustration compares a conventional battery swapping technique where several batteries are placed in series versus the battery formation put forward by the method and system of the present invention, where the electric vehicle can have a substantially higher range and flexibility with the application of the same effort because of the selective series formation as opposed to draining all batteries together in series in the conventional swapping method.

Consider two electric vehicles, A and B. Vehicle A has a conventional battery swapping model whereas vehicle B is powered by the method and system of the invention. Each vehicle has 16 batteries of the same capacity having the same weight and requiring the same effort to be swapped. Each vehicle must complete 320 kilometers, and each battery unit provides the vehicles a range of 20 kilometers. After every 40 kilometers, the drivers of each vehicle swap two batteries with two fully charged batteries. In vehicle A, any two batteries may be swapped as all the battery units drain together and have the same charge percentage. In vehicle B, processor 108 determines which two batteries have been fully drained and informs the driver of the batteries which need to be swapped.

For the purpose of this illustration, consider that the selected batteries in the invention are drained to 0.1% to display their peak efficiency as opposed to the otherwise used 10% threshold. This practice is repeated till each vehicle has completed 320 kilometers. After 320 kilometers has been completed, the average charge percentage in vehicle A is calculated using the following formula, $$[[\{(\text{Average charge \% of batteries before Run})-(\text{Current in terms of Charge \% of batteries used during run})\}*\{\text{Number of Batteries not being swapped}\}]+[100*\text{Number of Batteries being swapped}]]/\text{Total Number of Batteries}$$

The above formula is to calculate the average charge level of all batteries in the conventional swapping method (vehicle A in this case) after each run of 40 km and after two batteries have been swapped since all batteries drain together.

For example, $$[\{(89.0625-12.5)*(14)\}+\{100*2\}]/16=79.421.$$

The following formula is used for calculating the total average of current in an electric vehicle (vehicle B in this case) which uses the method and system of the invention.

[{2*Replacement Battery Value}+{14*100}]/16

Replacement Battery Value=100−(Number of Times Swapped*Threshold Value)

For example,

Replacement Battery Value=100−(2*0.1)=99.8
[{2*99.8}+{14*100}]/16=99.9750

Both the aforementioned formulas are specific to this illustration and since there is a specified use and change of battery units.

The results are provided in Table 4 below.

TABLE 4

| Kilometers Covered | Vehicle A (Avg. Charge %) | Vehicle B (Avg. Charge %) |
|---|---|---|
| 0 | 100 | 100 |
| 40 | 89.0625 | 99.9875 |
| 80 | 79.4921 | 99.9750 |
| 120 | 71.1181 | 99.9625 |
| 160 | 63.7908 | 99.9500 |
| 200 | 57.3795 | 99.9375 |
| 240 | 51.7695 | 99.9250 |
| 280 | 46.8608 | 99.9125 |
| 320 | 42.5657 | 99.9000 |

With the help of Table 4, the stage wise figures of both the vehicles having completed 320 kilometers are clearly visible. Based on the results, it is shown that vehicle B can run for almost another 320 kilometers without having to charge the batteries, while its conventional swapping counterpart, vehicle A, will only be able to run for less than half of the distance that vehicle B covers.

The present invention is advantageous since it can simplify and advance the use of electrical vehicles by offering an ergonomic and practical system which provides the user a long range, allowing hassle-free flexible charging options as well as the choice to increase vehicle mileage (subject to the maximum possible energy which can be stored) for electric vehicles, and a quick and substantially faster battery charge turnaround.

An important element of this invention is that it prioritizes the use of a pre-determined number of battery units, as opposed to draining all the battery units at once in a series formation, by deciding which battery units must form the selective series.

Another important element of the invention is the way the battery units of the primary energy source are drained, wherein the energy flow is handed over by the computer from one or more battery units of the initial set to other battery unit(s) after a pre-determined discharge level of the battery unit(s) in the initial set has been reached. Such prioritization and change of battery units is performed by a plurality of relay switches which are controlled by a computer.

Further, the invention enables the electric vehicle to make use of battery units which may weigh approximately 5 kilograms each. The light weight of battery units is quintessential to support the flexibility of charging options. These battery units are designed such that the consumer can either charge the battery units through the charging port given in the electric vehicle or remove a drained battery unit and replace it with a fully charged battery unit (swap the battery), or simply remove one or more battery units and charge it from a wall socket using a charger (may be at home or workplace).

Those skilled in the art will realize that the above recognized advantages and other advantages described herein are merely exemplary and are not meant to be a complete rendering of all of the advantages of the various embodiments of the invention.

The system, as described in the invention or any of its components may be embodied in the form of a computing device. The computing device can be, for example, but not limited to, a general-purpose computer, a programmed microprocessor, a micro-controller, a peripheral integrated circuit element, and other devices or arrangements of devices, which can implement the steps that constitute the method of the invention. The computing device includes a processor, a memory, a nonvolatile data storage, a display, and a user interface.

In the foregoing specification, specific embodiments of the invention have been described. However, one of ordinary skill in the art appreciates that various modifications and changes can be made without departing from the scope of the invention as set forth in the claims below. Specifically, although the arrangement of the invention has apparent applications in electric vehicles, the arrangement and applications of the invention may be extended to other electric loads in general, such as, but not limited to, smart grids.

Accordingly, the specification and figures are to be regarded in an illustrative rather than a restrictive sense, and all such modifications are intended to be included within the scope of the invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

I claim:

1. A method for managing the usage of a plurality of battery units (102a-102n) to power an electric vehicle using a computer-controlled electric circuit (110) including a plurality of relay switches (112a-112n), the method comprising:

determining, by one or more computer processors (108), at least one battery unit of an initial set of battery units to be replaced based on a status of the at least one battery unit, wherein the initial set comprises at least two battery units of the plurality of battery units connected in series;

in response to the determining, identifying, by one or more computer processors (108), at least one replacement battery unit of the plurality of battery units (102a-102n) for handing over energy flow from the at least one battery unit to be replaced to the at least one replacement battery unit, wherein the handing over comprises:

controlling, by one or more computer processors (108), operations of at least one relay switch of the plurality of relay switches (112a-112n) of the electric circuit (110) to engage/connect the at least one replacement battery unit in series with the initial set of battery units and to then disengage/disconnect the at least one battery unit to be replaced from the initial set of battery units, wherein controlling the operations of the at least one relay switch is done in an iterative/recursive manner for:

engaging/connecting, by one or more computer processors (108), a remaining replacement battery unit of the at least one replacement battery units in series with remaining battery units of the initial set of battery units; and disengaging/disconnecting, by one or more computer processors (108), a remaining battery unit to be replaced from the remaining battery units of the initial set of battery units.

2. The method as claimed in claim 1 comprises, selecting, by one or more computer processors (108), the at least two battery units to form the initial set of battery units, wherein, the at least two battery units are selected based on a charge level and a serial number of the at least two battery units.

3. The method as claimed in claim 1, wherein a status of the at least one battery unit comprises at least one of, the at least one battery unit reaching a pre-determined discharge level, a malfunction of the at least one battery unit, and a disconnection of the at least one battery unit.

4. The method as claimed in claim 1, wherein at least one battery unit having the highest charge level and the lowest serial number is identified from the plurality of battery units (102a-102n) for replacing the at least one battery unit to be replaced from the initial set of battery units.

5. The method as claimed in claim 1, wherein the handing over further comprises charging at least one battery unit using one of an external power source, and a regenerative braking system.

6. The method as claimed in claim 5, wherein the at least one battery unit having the lowest charge level and the highest serial number is selected from the plurality of battery units (102a-102n) for charging.

7. A system (100) for managing the usage of a plurality of battery units (102a-102n) to power an electric vehicle using a computer-controlled electric circuit (110) including a plurality of relay switches (112a-112n), the system (100) comprising:

a memory (106);

one or more computer processors (108) communicatively coupled to the memory, the one or more computer processors (108) configured to:

determine at least one battery unit of an initial set of battery units to be replaced based on a status of the at least one battery unit, wherein the initial set comprises at least two battery units of the plurality of battery units (102a-102n) connected in series;

in response to the determining, identify at least one replacement battery unit of the plurality of battery units (102a-102n) for handing over energy flow from the at least one battery unit to be replaced to the at least one replacement battery unit, wherein the one or more computer processors (108) are further configured to:

control operations of at least one relay switch of the plurality of relay switches (112a-112n) of the electric circuit (110) to engage/connect the at least one replacement battery unit in series with the initial set of battery units and to then disengage/disconnect the at least one battery unit to be replaced from the initial set of battery units, wherein the one or more computer processors (108) are configured to control the operations of the at least one relay switch is done in an iterative/recursive manner for:

engaging/connecting a remaining replacement battery unit of the at least one replacement battery units in series with remaining battery units of the initial set of battery units; and disengaging/disconnecting a remaining battery unit to be replaced from the remaining battery units of the initial set of battery units.

8. The system as claimed in claim 7, wherein the one or more computer processors (108) are configured to select the at least two battery units to form the initial set of battery units, wherein, the at least two battery units are selected based on a charge level and a serial number of the at least two battery units.

9. The system as claimed in claim 7, wherein a status of the at least one battery unit comprises at least one of, the at least one battery unit reaching a pre-determined discharge level, a malfunction of the at least one battery unit, and a disconnection of the at least one battery unit.

10. The system as claimed in claim 7, wherein the at least one replacement battery unit having the highest charge level and the lowest serial number is identified from the plurality of battery units (102a-102n) for replacing the at least one battery unit to be replaced from the initial set of battery units.

11. The system as claimed in claim 7, wherein the one or more computer processors (108) are further configured to charge at least one battery unit using one of an external power source, and a regenerative braking system.

12. The system as claimed in claim 11, wherein the at least one battery unit having the lowest charge level and the highest serial number is selected from the plurality of battery units (102a-102n) for charging.

* * * * *